United States Patent Office 2,763,434
Patented Sept. 18, 1956

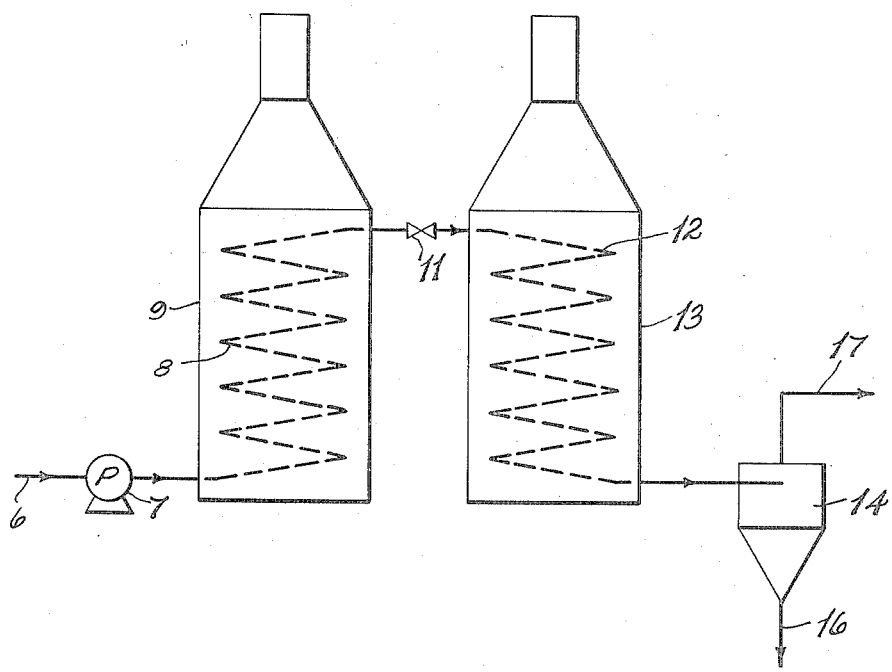

2,763,434

PROCESS FOR PULVERIZING SOLIDS IN FLUID SUSPENSION

Dale M. Strasser, Amarillo, Tex., assignor to The Texas Company, New York, N. Y., a corporation of Delaware Application May 1, 1952, Serial No. 285,459

8 Claims. (Cl. 241—5)

This invention relates to a process for disintegration of solid material. In one of its more specific aspects, it relates to pulverization of frangible solids in an elongated zone of restricted cross-sectional area.

In a co-pending application of duBois Eastman and Leon P. Gaucher, Serial No. 49,626, filed September 16, 1948, now abandoned, a novel process is disclosed for heating and pulverizing solid materials, for example, coal. As disclosed in said application, particles of solid material are admixed with a vaporizable liquid to form a slurry or fluid suspension of solid particles in liquid. The slurry is passed in a continuous stream along an elongated path of restricted cross-sectional area, e. g., through a tubular conduit, where the liquid is vaporized. In a preferred embodiment, the slurry passes through an externally heated conduit wherein the liquid is vaporized. Vaporization of the liquid results in a dispersion of the solid particles in a stream of vapor. Volume expansion accompanying vaporization imparts a corresponding increase in velocity to the stream with the result that a high velocity stream of vapor carrying entrained solid particles is produced. An appreciable amount of disintegration of the solid is obtained.

The present invention provides an improvement in the above described type process of grinding. In accordance with the present invention the slurry is heated under pressure in the region of the critical pressure to a temperature in the region of the critical temperature, the pressure is suddenly reduced to a lower pressure at which at least a major portion of the liquid flash vaporizes from the slurry and the resulting dispersion is made to flow at high velocity along an elongated passage of restricted cross-sectional area.

The liquid used for preparation of the suspension should be stable and substantially inert with respect to reaction with the solid at the temperature employed in the pulverizing process. Water is generally one of the most suitable liquids for this purpose. Various other liquids which are stable at or near their criticial pressure and temperatures may be used, as, for example, light hydrocarbons.

The quantity of liquid admixed with the solid to form a fluid slurry may vary considerably. A minimum of about 35 per cent by volume is required, based upon the apparent volume of the granular solid. Generally it is desirable to use the minimum amount required for forming a fluid slurry. The required amount is readily determined by trial. The slurry may be pumped with suitable equipment, for example, with a piston pump of the type commonly used for handling drilling mud in well drilling operations.

In most applications of this process, the solid feed material need be reduced only to a particle size such that it may be readily handled as a suspension or slurry. It is preferable to use particles smaller than about ¼ inch in average diameter. Particles of 100 mesh size and smaller are most readily handled as a slurry.

The slurry or suspension is heated to effect vaporization of the liquid. The heating may be effectively carried out in a tubular heater of conventional design in which fluid is passed through externally heated tubes. A heater in which the tubes are wound in a coil for example, a heater of the type commonly used for heating steam or gaseous hydrocarbons, is preferred. A pipe still type furnace of the type commonly used in the refining of petroleum is also suitable.

The slurry is fed into a heater at a rate sufficient to prevent the solid particles from settling out of the slurry. The linear velocity of slurry at the inlet to the heating tube should generally be within the range of from about ½ to 10 feet per second, preferably in excess of 1 foot per second. The velocity of the resulting dispersion of solid particles in vapor is preferably above about 60 feet per second and may be as high as 3,000 feet per second or more.

The temperature and pressure relations affecting vaporization are well known. Also, the critical pressures and critical temperatures for various liquids are known. Water, for example has a critical pressure of 3226.0 pounds per square inch absolute and a critical temperature of 706.1° F.

In carrying out the operation in a tubular heater, one section of the tubing acts as a preheating section, a second, as a vaporizing section of the tubing, and the remainder, as a pulverizing section. The pulverizer, or pulverizing section of tubing, is preferably a conduit having a substantially uniform cross-sectional area equivalent to a tube of one-half to two inches in internal diameter and having a length at least 100 times its diameter, or equivalent. Conduits having a length of from about 1,000 to 5,000 diameters, or equivalent, are preferred.

Without wishing to limit the present invention in any way, the following explanation is offered as a possible mechanism of the disintegrating action obtained in the process. The highly turbulent flow of the vapors through the pulverizing section of the tubing causes innumerable collisions of the particles with one another and with the walls of the tubing. This results in a high degree of pulverization which may be carried to the point where the average diameter of the particle is on the order of from 1 to 5 microns.

The extent of pulverization, or fineness of the resulting product depends to a large extent upon the velocity of flow attained in the vapor section or pulverizing section of the tubing. The velocity increase upon vaporization of the liquid is related to the volume expansion which takes place upon vaporization. This, in turn, depends upon the temperature and pressure of the system. In going from liquid water at 100° F. and atmospheric pressure to saturated steam at 212° F. and atmospheric pressure, a volume expansion of some 1,665 times takes place. Similarly, there is a 240 fold increase in volume in going from liquid water at 100° F. and atmospheric pressure to saturated steam at 100 pounds per square inch gauge. At 425 pounds per square inch gauge, saturated steam occupies a volume some 60 times that of liquid water at 100° F. and atmospheric pressure. From this, it will be seen that low pressure in the vapor section (or pulverizing section) favors high velocity and disintegration.

In the operation of the process described in said co-pending patent application, with some solid particles, the slurry preheaters are subject to plugging. The plugging occurs in that section of the heater in which the change in phase of liquid to vapor takes place. Plugging does not occur either in the section of the tubing in which the liquid slurry is preheated to the boiling point or in that section of the tubing in which the particles of solid are suspended in dry steam. In a heater in which the slurry and resulting dispersion are passed through a tube of uniform diameter, without restriction, the portion of the tubing in which the phase change, or vaporization, occurs comprises a considerable portion of the total tubing. This follows from the fact that the latent heat of vaporization is a large fraction of the total heat input required. Furthermore, the vaporization section may tend to change position within the heater during operation.

The present invention provides a pulverizing process of the type described in which the vaporization section of the heater is limited to a very short section of the tube. This is accomplished by preheating the slurry under pressure, then suddenly reducing the pressure on the preheated slurry to effect vaporization of at least a major portion of the liquid. Preferably the pressure in the preheating section of the heater is maintained in the region of, or in excess of, the critical pressure of the liquid. In other words, the slurry is preheated under a pressure approaching or exceeding the critical pressure of the liquid, and subsequently permitted to vaporize by reduction of the pressure. The liquid is heated under pressure to a temperature sufficient to cause the major portion of the liquid to vaporize upon subsequent reduction in pressure.

In a preferred mode of operation of the process of this invention, a slurry of granular solid in liquid is made up. The slurry is raised to a pressure in the region of the critical pressure, preferably above the critical pressure, and introduced as a continuous stream into a tubular heater. While under this pressure, the temperature of the slurry is raised to a temperature in the region of the critical temperature of the slurrying liquid. The preheated slurry is then passed through a throttle valve, which may comprise an orifice or Venturi, through which it is expanded to a pressure below its initial pressure to insure vaporization of at least a major portion of the liquid. This vaporization takes place substantially instantaneously and results in suspension of the solids in the resulting vapor without any tendency to plugging of the tubing.

By way of example, the invention may be operated with water as the slurrying liquid in the following manner. Sufficient water is mixed with a granular solid to form a pumpable slurry. This slurry is then raised to a pressure of, for example, 3,500 pounds per square inch absolute and introduced to a tubular heating coil. The slurry is heated under pressure to a temperature of 800° F. Due to the frictional resistance to flow, the pressure at the outlet of the preheating section of the tubing is 3,300 pounds per square inch absolute. Under these conditions, sufficient heat is contained in the liquid to vaporize the liquid completely upon pressure reduction without additional heating. This preheated slurry is passed through a Venturi which acts as a throttle valve to suddenly reduce the pressure to 1,000 pounds per square inch absolute. Complete vaporization of the liquid takes place accompanied by a drop in temperature to about 600° F. The solid is immediately completely suspended or dispersed in the resulting steam. This dispersion of solid in steam is passed through an additional section of tubing to obtain pulverization of the solid. At the same time, heat is supplied to the pulverization section to further preheat the solid. The dispersion is discharged from the pulverizing section at 200 pounds per square inch absolute and 1,000° F.

It will be understood that it may not be necessary to preheat the liquid to a temperature sufficient to completely vaporize the liquid upon expansion. In some cases it may be desirable to preheat the liquid to a lesser extent and to subsequently vaporize the liquid remaining after expansion by additional heating. It will be evident that the pressure required to prevent vaporization during the preheating depends upon the liquid chosen as a carrier. It will also be understood that the temperature to which the liquid is preheated depends, not only upon the particular liquid chosen, but also upon the concentration of solids in the liquid and the heat characteristics of the solids. Upon expansion through the throttle valve, the preheated solid will, of course, give up a part of its heat to the fluid, thus helping to vaporize the carrier liquid.

The solid particles may be separated from the vapor upon discharge from the heater. A cyclone or centrifugal separator is suitable for this purpose.

The process of this invention will be more readily understood from the accompanying drawing, which illustrates diagrammatically an arrangement of apparatus suitable for carrying out the process.

With reference to the drawing, a fluid slurry of solid in a suitable suspending liquid is introduced through line 6 to pump 7. The pump raises the pressure of the slurry and supplies the slurry, preferably at a uniform rate, to a heating coil 8 in furnace 9. In this arrangement, the coil 8 is the preheating section, serving to heat the slurry under pressure without substantial vaporization of the carrier liquid. The heater is of conventional design comprising a helically wound coil of tubing disposed within a suitable furnace. The preheated slurry is passed through valve 11 to a second tubular coil 12. Coil 12 is similar to coil 8 and is disposed within a suitable furnace 13. Additional heating of the stream may be provided, if desired, by heating coil 12. The dispersion of powdered solid and vapor is discharged from coil 12 into a cyclone separator 14 where the powdered solid is separated from the vapor. The separated solid is discharged through line 16 while vapor is withdrawn through line 17.

The conduit employed in the pulverization process may be either straight or curved. If curved, it is not necessary for the conduit to take any particular form. A coil is preferred to reduce erosion and to provide a compact arrangement in which a considerable length of tubing, for example, may be provided in relatively small space. The tubes or conduits in the preheating section and in the pulverizing section of the process may be either the same size or different sizes.

Obviously many modifications and variations of the invention, as hereinbefore set forth, may be made without departing from the spirit and scope thereof and, therefore, only such limitations should be imposed as are indicated in the appended claims.

I claim:

1. A process for pulverizing solid material which comprises admixing said solid in granular form with a vaporizable liquid in an amount sufficient to form a slurry, passing a continuous stream of said slurry through a heating zone at a velocity within the range of from about ½ to about 10 feet per second, heating said stream of slurry in said heating zone at an elevated pressure in excess of the critical pressure of said liquid to an elevated temperature sufficient to effect vaporization of the major portion of said liquid upon subsequent reduction of pressure, subjecting said stream of heated slurry to substantially instantaneous pressure reduction into an elongated passageway maintained at a pressure sufficiently below the pressure in said heating zone to cause vaporization of a major portion of said liquid as a result of said pressure reduction thereby forming a stream of powdered solid dispersed in resulting vapor, and maintaining the velocity of flow of said stream of dispersion in said elongated passageway in excess of about 60 feet per second thereby effecting pulverization of said solid.

2. A process as defined in claim 1 wherein said slurry is heated to a temperature in excess of the critical temperature of said liquid.

3. A process as defined in claim 1 wherein said elongated passageway is circular in cross-section and has an internal diameter within the range of from about ½ to about 2 inches.

4. A process as defined in claim 3 wherein said elongated passageway has a length at least 100 times its diameter.

5. A process for pulverizing solid particles which comprises mixing said particles with a vaporizable liquid in an amount sufficient to form a slurry; passing a stream of said slurry to a heating zone; heating said slurry in said heating zone to a temperature sufficient to effect substantially instantaneous vaporization of said liquid upon subsequent reduction of pressure, while maintaining the pressure thereof in the region of the critical pressure of said liquid, thereby maintaining the state of said liquid; instantaneously reducing the pressure on said stream of heated slurry sufficiently to vaporize the liquid of said stream substantially instantaneously and form a flowing stream of a dispersion of said particles in vapor, thereby avoiding the existence of an extended zone wherein both liquid and vapor are present; and then disintegrating said particles by passing said stream of dispersion through a passageway in highly turbulent flow at a velocity in excess of 60 feet per second.

6. A process in accordance with claim 5 wherein said liquid is water, and wherein the pressure and temperature of said slurry are maintained at about the critical values for water.

7. A process in accordance with claim 5, also comprising heating said stream of dispersion during flow thereof through said passageway.

8. A process for pulverizing solid particles which comprises mixing said particles with a vaporizable liquid in an amount sufficient to form a flowable mixture; passing a stream of said flowable mixture to a heating zone; heating said flowable mixture in said heating zone to a temperature sufficient to effect substantially instantaneous vaporization of said liquid upon subsequent reduction of pressure, while maintaining the pressure thereof in the region of the critical pressure of said liquid, thereby maintaining the state of said liquid; instantaneously reducing the pressure on said stream of heated flowable mixture sufficiently to vaporize the liquid of said stream substantantially instantaneously and form a flowing stream of a dispersion of said particles in vapor, thereby avoiding the existence of an extended zone wherein both liquid and vapor are present; and then disintegrating said particles by passing said dispersion through a succeeding zone of high velocity flow, while subjecting the flowing stream therein to turbulence and a velocity in excess of 60 feet per second, thereby effecting disintegration of said particles.

References Cited in the file of this patent
UNITED STATES PATENTS

| | | |
|---|---|---|
| 1,950,558 | Karrick | Mar. 13, 1934 |
| 2,315,083 | Chesler | Mar. 30, 1943 |
| 2,315,084 | Chesler | Mar. 30, 1943 |
| 2,515,541 | Yellott | July 18, 1950 |
| 2,515,542 | Yellott | July 18, 1950 |
| 2,545,518 | Hewitt | Mar. 20, 1951 |
| 2,560,807 | Lobo | July 17, 1951 |
| 2,568,400 | Kearby | Sept. 18, 1951 |